Pyron & Bruce,
Converting Motion.
Nº 26,709.  Patented Jan. 3, 1860.
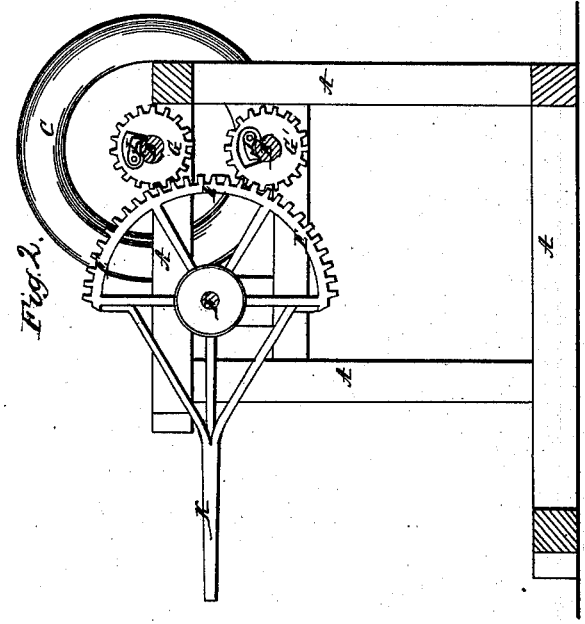
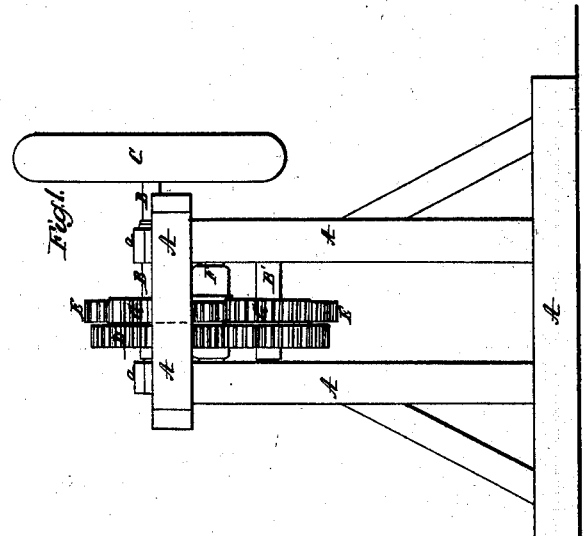
Witnesses:
Inventors:

UNITED STATES PATENT OFFICE.

C. L. PYRON AND ROBERT BRUCE, OF MANCHESTER, TENNESSEE.

MACHINERY FOR CHANGING MOTION.

Specification of Letters Patent No. 26,709, dated January 3, 1860.

*To all whom it may concern:*

Be it known that we, C. L. PYRON and ROBT. BRUCE, of Manchester, in the county of Coffee and State of Tennessee, have invented a new and useful Mode of Converting Vibratory into a Continuous Rotary Motion; and we do hereby declare that the following is a full, clear, and exact description of the same, reference being had to the accompanying drawings, forming a part of this specification, in which—

Figure 1 represents an elevation taken from the rear of a machine for changing vibratory into rotary motion. Fig. 2 is a longitudinal elevation of the same machine showing in sections the arrangement of clutches for communicating motion from the segmental rack to the fly wheel or main driving shaft, the two larger spur wheels being removed from the shafts.

Similar letters of reference indicate corresponding parts in both figures.

The object of our invention is to obtain power from the motion of the waves, to be applied and used for various purposes, also to form a convenient method of transmitting motion from the piston rods of steam engines (in cases where it is found impracticable to use a balance wheel) and converting its alternating rectilinear motion into a continuous rotary motion.

Our contrivance will be found applicable for many purposes where a change of motion is required, and it may be readily modified with slight mechanical alterations and adapted to the objects for which it is required to perform.

Our invention consists in a novel arrangement of loose and fixed spur wheels upon parallel shafts, with a segmental rack, from which rack projects out a suitable distance a lever or working beam, so that by elevating and depressing said beam or vibrating it a continuous rotary motion will be transmitted to the shafts carrying the spurred gearing and this motion may be communicated to various kinds of machinery by connecting rods, belts and pulleys or other suitable contrivance, described and represented as follows.

To enable those skilled in the art to fully understand our invention we will proceed to describe its construction and operation.

The drawings represent our invention mounted and supported in a frame work A, but it will be obvious by the following description that the size and proportions of the parts, and their arrangement will much depend upon the objects for which the device is intended to serve, therefore it will be understood that the drawings do not illustrate any special application of the device, but simply the device itself with those parts constituting my invention.

Upon top of the frame A, is a shaft B, turning in suitable journal boxes $a, a$, and on one end of this shaft B, is fixed a balance wheel C, to equalize the motion of the shaft.

D, is a spur wheel keyed securely to the shaft B, which engages with the teeth of a similar wheel D', which latter is keyed to a shaft B', placed parallel with shaft B. These wheels are operated so as to turn in opposite directions, and with a uniform continuous motion, by a segmental rack E, which works upon a shaft F, and engages with the teeth of spur wheels G, G.

J, J, are pawls recessed into the sides of spur wheels G, G', which permit the shafts to turn freely in opposite directions as indicated by arrows in Fig. 2, but which lock or clutch the wheels G, G', to the shafts B B', alternately as the segmental rack E, oscillates upon its axle. This oscillation of the rack imparts to the shafts through the medium of spur wheels D, D', a continuous rotary motion which motion is equalized by a balance wheel C, as above stated.

By connecting with the segmental rack E, a working beam or lever K, suitably braced and of a sufficient length, great power can be obtained and by suspending from the extreme end of this lever K, a suitable buoy or float, a rotary motion may be imparted to the shafts D, D', by the surging of the waves of the sea, which motion may be utilized and applied for various purposes. This lever or beam K, may also be attached to the connecting rod of steam engines where a fly wheel could not be conveniently used, and for many purposes where from all alternate reciprocating motion a rotary motion is desired our device will be found convenient and useful.

Having thus described our invention what we claim and desire to secure by Letters Patent, is,

The combination of segmental rack E, with lever or beam K, in combination with clutch wheels G, G′, and spur wheels D, D′, arranged and operating in the manner and for the purposes herein set forth.

C. L. PYRON.
ROBERT BRUCE.

Witnesses:
 HIRAM S. EMERSON,
 DAVID WIZAR.